(12) United States Patent
Ho

(10) Patent No.: US 10,569,909 B2
(45) Date of Patent: Feb. 25, 2020

(54) SYSTEMS AND METHODS FOR SATELLITE ORBIT AND MOMENTUM CONTROL

(71) Applicant: The Boeing Company, Chicago, IL (US)

(72) Inventor: Yiu-Hung Monte Ho, Palos Verdes Estates, CA (US)

(73) Assignee: THE BOEING COMPANY, Chicago, IL (US)

(*) Notice: Subject to any disclaimer, the term of this patent is extended or adjusted under 35 U.S.C. 154(b) by 118 days.

(21) Appl. No.: 15/085,081

(22) Filed: Mar. 30, 2016

(65) Prior Publication Data
US 2017/0283094 A1    Oct. 5, 2017

(51) Int. Cl.
*B64G 1/24* (2006.01)
*B64G 1/26* (2006.01)

(52) U.S. Cl.
CPC .............. *B64G 1/242* (2013.01); *B64G 1/26* (2013.01)

(58) Field of Classification Search
CPC .......... B64G 1/26; B64G 1/242; B64G 1/222; B64G 1/40
See application file for complete search history.

(56) References Cited

U.S. PATENT DOCUMENTS

| | | | |
|---|---|---|---|
| 3,530,009 A * | 9/1970 | Dick | B64G 1/222 136/202 |
| 4,767,084 A | 8/1988 | Chan et al. | |
| 4,955,559 A * | 9/1990 | Kaminskas | B64G 1/26 244/169 |
| 5,349,532 A * | 9/1994 | Tilley | B64G 1/26 244/164 |
| 5,443,231 A | 8/1995 | Anzel | |
| 5,826,831 A | 10/1998 | Anzel | |
| 6,015,116 A | 1/2000 | Anzel et al. | |

(Continued)

FOREIGN PATENT DOCUMENTS

| FR | 3022530 | 12/2015 |
|---|---|---|
| JP | H02141399 | 5/1990 |

(Continued)

OTHER PUBLICATIONS

Merriam-Webster, "diagonal", https://www.merriam-webster.com/dictionary/diagonal; accessed Dec. 29, 2017.*

(Continued)

*Primary Examiner* — Philip J Bonzell
(74) *Attorney, Agent, or Firm* — Hanley, Flight & Zimmerman, LLC

(57) ABSTRACT

An example spacecraft includes a first arm having a first end pivotably coupled to the spacecraft and a second end. The example spacecraft includes a first thruster rotatably coupled to the second end of the first arm. The first arm extends from the first pivot point along a first edge of an anti-nadir face of the spacecraft when the first arm is in a stowed position. The first arm is configured to pivot between the stowed position, a first extended position in which the first arm extends outward from the spacecraft relative to the first edge, and a second extended position in which the first arm extends along a third edge of the anti-nadir face and the first thruster is disposed outward of a second edge of the anti-nadir face opposite the first edge.

24 Claims, 8 Drawing Sheets

(56) References Cited

U.S. PATENT DOCUMENTS

| | | | |
|---|---|---|---|
| 6,032,904 A * | 3/2000 | Hosick | B64G 1/26 244/169 |
| 6,042,058 A | 3/2000 | Anzel | |
| 6,135,394 A * | 10/2000 | Kamel | B64G 1/242 244/158.8 |
| 6,296,207 B1 * | 10/2001 | Tilley | B64G 1/242 244/165 |
| 6,481,672 B1 * | 11/2002 | Goodzeit | B64G 1/26 244/169 |
| 6,565,043 B1 * | 5/2003 | Wittmann | B64G 1/242 244/169 |
| 6,637,701 B1 * | 10/2003 | Glogowski | B64G 1/242 244/164 |
| 7,918,420 B2 | 4/2011 | Ho | |
| 8,282,043 B2 | 10/2012 | Ho | |
| 8,439,312 B2 | 5/2013 | Ho | |
| 8,915,472 B2 | 12/2014 | Aston et al. | |
| 8,973,873 B2 | 3/2015 | Aston et al. | |
| 9,180,984 B2 | 11/2015 | Peterka, III et al. | |
| 9,394,065 B2 | 7/2016 | Aston et al. | |
| 9,643,739 B2 | 5/2017 | Peterka, III et al. | |
| 9,663,251 B2 * | 5/2017 | Munir | B64G 1/26 |
| 9,939,260 B2 | 4/2018 | McNair et al. | |
| 9,957,068 B2 | 5/2018 | Aston et al. | |
| 10,005,568 B2 | 6/2018 | Lui et al. | |
| 2004/0164205 A1 * | 8/2004 | Kellberg | B64G 1/405 244/171.1 |
| 2009/0166476 A1 * | 7/2009 | Termini | B64G 1/1078 244/158.6 |
| 2010/0250031 A1 * | 9/2010 | Paschall, II | G01C 21/24 701/8 |
| 2011/0196550 A1 * | 8/2011 | Carrico, Jr. | B64G 3/00 701/13 |
| 2012/0053831 A1 * | 3/2012 | Halder | G01C 21/165 701/439 |
| 2013/0292516 A1 * | 11/2013 | Celerier | B64G 1/405 244/158.6 |
| 2013/0313369 A1 * | 11/2013 | Celerier | F02K 9/84 244/158.6 |
| 2014/0061386 A1 * | 3/2014 | Peterka, III | B64G 1/002 244/171.5 |
| 2014/0361123 A1 * | 12/2014 | Celerier | B64G 1/40 244/158.6 |
| 2015/0274328 A1 * | 10/2015 | Wallner | B64G 3/00 701/519 |
| 2015/0284111 A1 * | 10/2015 | Post | B64G 1/242 244/158.6 |
| 2016/0046394 A1 | 2/2016 | Peterka, III et al. | |
| 2016/0061598 A1 | 3/2016 | McNair et al. | |
| 2016/0114909 A1 * | 4/2016 | Walker | B64G 1/222 244/158.5 |
| 2016/0167810 A1 * | 6/2016 | Janu | B64G 1/24 244/171.2 |
| 2016/0176545 A1 * | 6/2016 | Munir | B64G 1/26 244/158.6 |
| 2017/0081048 A1 * | 3/2017 | Glogowski | B64G 1/26 |
| 2017/0129627 A1 * | 5/2017 | Moro | B64G 1/242 |
| 2017/0137151 A1 | 5/2017 | Liu et al. | |
| 2017/0297747 A1 | 10/2017 | Peterka, III et al. | |
| 2018/0194495 A1 | 7/2018 | Lui et al. | |
| 2018/0201396 A1 | 7/2018 | Aston et al. | |
| 2019/0002133 A1 | 1/2019 | Peterka, III et al. | |
| 2019/0077525 A1 | 3/2019 | Liu et al. | |

FOREIGN PATENT DOCUMENTS

| | | | |
|---|---|---|---|
| NL | 1032158 | 1/2008 | |
| WO | WO-2015138592 A2 * | 9/2015 | B64G 1/26 |
| WO | WO-2016128389 A1 * | 8/2016 | B64G 1/007 |

OTHER PUBLICATIONS

Merriam-Webster.com, Definition of Proximate; https://www.merriam-webster.com/dictionary/proximate, accessed Jan. 3, 2019 (Year: 2019).*

European Patent Office, "Extended European Search Report," issued in connection with European patent application No. 17151559.6, dated Jul. 25, 2017, 7 pages.

European Patent Office, "Communication Pursuant to Article 94(3) EPC," issued in connection with application 17151559.6, dated Oct. 8, 2019, 4 pages.

* cited by examiner

SYSTEMS AND METHODS FOR SATELLITE ORBIT AND MOMENTUM CONTROL

FIELD OF THE DISCLOSURE

This disclosure relates generally to satellites and, more particularly, to systems and methods for satellite orbit and momentum control.

BACKGROUND

Space vehicles such as satellites or resident space objects typically encounter forces such as solar radiation pressure and gravitational effects from the sun and the moon when deployed in space. Such forces can affect a satellite's position within a predetermined orbital station. The satellite typically includes thrusters that generate velocity changes to control or maintain the satellite's position.

The forces acting on the satellite can also affect attitude of the satellite. The satellite can include a reaction wheel to control the satellite's attitude by generating angular velocity changes. However, the reaction wheel may build up momentum over time that needs to be cancelled or dumped. The thrusters of the satellite generate torques that are applied to the satellite to dump the stored momentum.

SUMMARY

An example spacecraft disclosed herein includes a first arm having a first end pivotably coupled to the spacecraft and a second end. The example spacecraft includes a first thruster rotatably coupled to the second end of the first arm. The first arm is to selectively pivot about the spacecraft to position the first thruster to generate a change in velocity of the spacecraft to maintain the spacecraft within an orbit station.

Also disclosed herein is an example method for determining, by executing an instruction with a processor, a first position of a first thruster of a satellite relative to the satellite to correct an orbit of the satellite. The example method includes pivoting, by executing an instruction with the processor, a first arm coupled to the satellite about the satellite to move the first thruster to the first position. The thruster is rotatably coupled to the first arm.

An example apparatus disclosed herein includes a first arm pivotably coupled to a spacecraft and a first thruster rotatably coupled to the first arm. The example apparatus includes a controller including a processor. The controller is to determine an amount to pivot the first arm about the spacecraft to position the first thruster to generate a change in velocity of the spacecraft to maintain the spacecraft within an orbit station.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
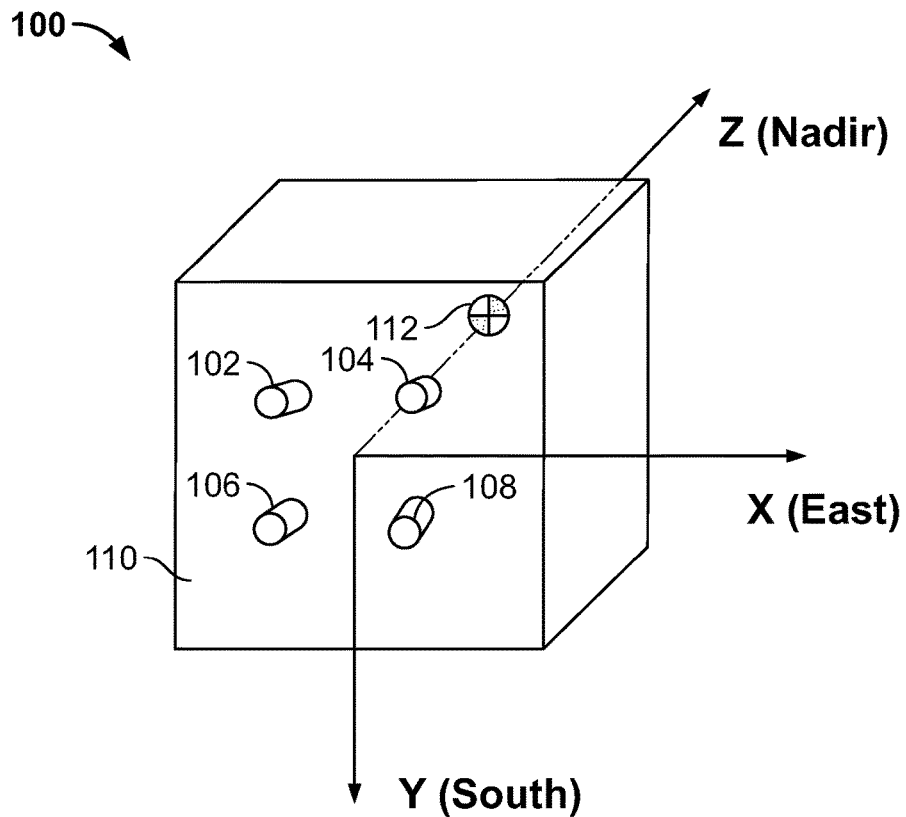
FIG. 1 is a schematic illustration of an example satellite having a thruster system known in the prior art.

A satellite includes a plurality of thrusters that provide for orbit and momentum control of the satellite. FIG. 1 is a schematic drawing of a known satellite 100 having a thruster system including a first thruster 102, a second thruster 104, a third thruster 106, and a fourth thruster 108 coupled an anti-nadir face 110 of the satellite 100 (e.g., a back of the satellite 100). Each of the first through fourth thrusters 102, 104, 106, 108 is disposed on a respective gimbaled or rotatable platform. The first through fourth thrusters 102, 104, 106, 108 are used to maintain the satellite 100 in an assigned orbit, or to provide for orbital stationkeeping. In some examples, the first through fourth thrusters 102, 104, 106, 108 are gimbaled to point away from a direction of a center of gravity 112 of the satellite 100 during firing. Such maneuvers are used to maintain the satellite 100 in a predetermined orbit station.

Forces acting on the satellite 100 such as gravitational forces from the sun and the moon and solar radiation pressure affect the position of the satellite 100 relative to its assigned orbit station. To counteract the forces and provide for orbital stationkeeping, the first through fourth thrusters 102, 104, 106, 108 individually fire to induce velocity changes in the satellite 100 and, thus, affect the orbital position of the satellite 100. For example, the respective first through fourth thrusters 102, 104, 106, 108 fire to control (1) inclination of the satellite 100, or a north/south position of the satellite 100 relative to the Earth's equator; (2) drift of the satellite 100, or an east/west position of the satellite 100 relative to a sub-satellite point on the Earth (e.g., a point at which a line between the satellite 100 and the center of the Earth intersects the Earth's surface); and/or (3) eccentricity of the satellite 100, or a deviation of the orbit of the satellite 100 from circularity. The firing of the first through fourth thrusters 102, 104, 106, 108 can also generate torque to provide momentum control by pointing the first through fourth thrusters 102, 104, 106, 108 away from the center of gravity 112 of the satellite 100.

Figure 2:
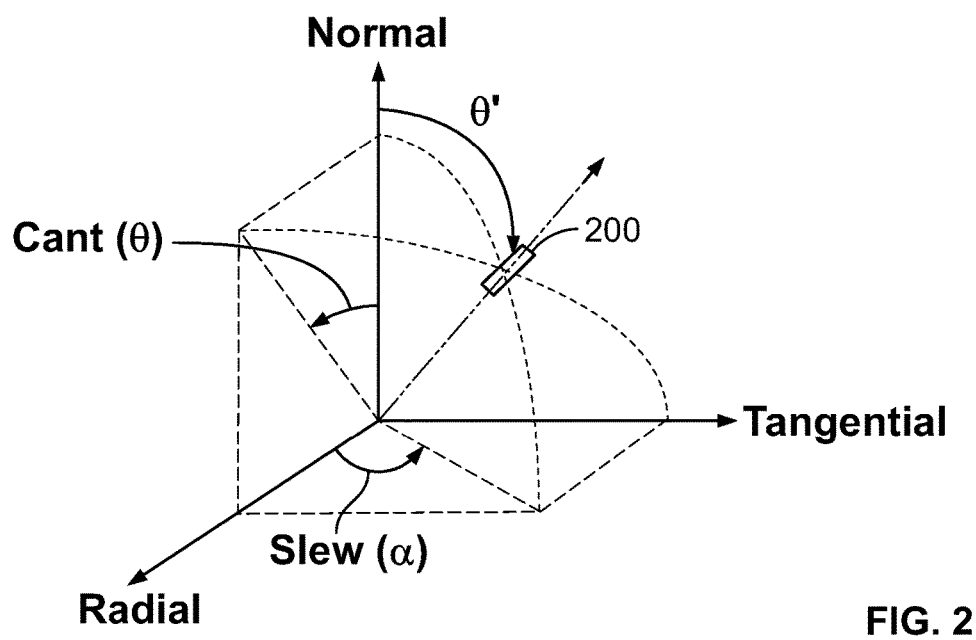
FIG. 2 is a graphical representation of directional components of a change in velocity generated in the example satellite of FIG. 1 as a result of firing of an example thruster of the thruster system of FIG. 1.

The firing of the respective first through fourth thrusters 102, 104, 106, 108 can induced a change in velocity ΔV in directions normal to the satellite's orbit path, tangential to the satellite's orbit path, and radial to the satellite's orbit path. FIG. 2 is a schematic drawing of an example thruster 200 of a satellite, illustrating the directional components of the change in velocity ΔV produced by the thruster 200 in the normal, tangential, and radial directions to provide orbit and momentum control for the satellite. Inclination control is provided by the ΔV normal components, drift control is provided by the ΔV tangential components, and eccentricity control is provided by the ΔV radial and tangential components. The magnitude of the respective ΔV components is determined by a cant angle θ, a slew angle α, and an angle θ' between the normal direction and a thrust vector defined as $\tan(\theta')=\tan(\theta)/\cos(\alpha)$. The moment arm of the thruster 200 to obtain, for example, momentum control, is established by pointing a thrust vector generated by the thruster 200 away from the center of gravity 112 to produce a desired torque during orbit control maneuvers.

Referring to again to FIG. 1, the first, second, third, and fourth thrusters 102, 104, 106, 108 are arranged in a rectangular pattern on the anti-nadir face 110 of the satellite 100 and coupled to the satellite 100 via the respective gimbaled platforms. However, such a coupling of the first through fourth thrusters 102, 104, 106, 108 to the satellite 100 fixes each of the first through fourth thrusters 102, 104, 106, 108 with respect to the center of gravity 112 of the satellite 100, thereby limiting the range of the thrusters 102, 104, 106, 108 with respect to the location of the center of gravity 112. Known efforts to increase the range of the location of the center of gravity are generally not effective. For example, increasing an amount of propellant (e.g., xenon) for the thrusters 102, 104, 106, 108 to produce thrust increases a weight of the satellite 100 and operational costs.

Another known technique for increasing a range of the center of gravity location includes relocating one or more of the thrusters 102, 104, 106, 108 on the anti-nadir face 110 of the satellite 100. However, moving the center of gravity in the +Z direction by relocating one or more of the first through fourth thrusters 102, 104, 106, 108 increases the cant angle θ, which reduces the efficiency with respect to inclination control of the satellite 100. Also, repositioning of one or more of the first through fourth thrusters 102, 104, 106, 108 can reduce the slew angle, which may result in inefficiencies with respect to control of the east/west orbital motion of the satellite 100. Further, the respective platforms to which the thrusters 102, 104, 106, 108 are coupled gimbal about fixed pivot points. Therefore, mere relocation of one or more of the first through fourth thrusters 102, 104, 106, 108 does not improve flexibility with respect to orbital control, as a distance between the thrusters 102, 104, 106, 108 and a distance of the thrusters 102, 104, 106, 108 to the center of gravity 112 are fixed.

In another known technique, an extension arm is coupled to each of the respective thrusters 102, 104, 106, 108. The extension arms increase flexibility with respect orbital control because the thrusters 102, 104, 106, 108 are spaced further apart from one another and from the center of gravity as compared to configurations without the extension arms. However, at least four thrusters are required (three of which fire to control inclination, drift, and/or eccentricity of the satellite 100) for redundancy in the event of failure of one of the thrusters. Thus, adding an extension arm does not reduce weight and/or operational costs of the satellite 100.

Example systems and methods disclosed herein provide for flexible orbit and momentum control using two thrusters rotatably mounted on a pivotable extension arm coupled to a face of the satellite. The examples disclosed herein provide additional degrees of freedom for orbit and momentum control by the thrusters with respect to (1) the increased length provided by the respective extension arms, which increases a distance of the thrusters from the center of gravity, and (2) the rotation of each extension arm about a respective pivot point relative to the satellite. The rotation of the two extension arms eliminates the need for four thrusters to provide orbit and momentum control. Each extension arm can move in a +/−north/south direction and a +/−east/west direction. Coupling the thrusters to the extension arms raises each thruster in the y-direction and reduces the cant angle θ, which increases efficiency with respect to inclination control of the satellite. Further, each thruster is respectively coupled to the extension arm via a gimbaled platform. The direction of the thrust generated by the thruster is set by rotating or steering the thruster via the gimbaled platform and the pivoting of the extension arm in the north/south or east/west directions. The examples disclosed herein provide for flexibility in generating torque. Further, the disclosed examples reduce fuel usage, weight of the satellite, a number of thruster firings, and operational costs.

Figure 3:
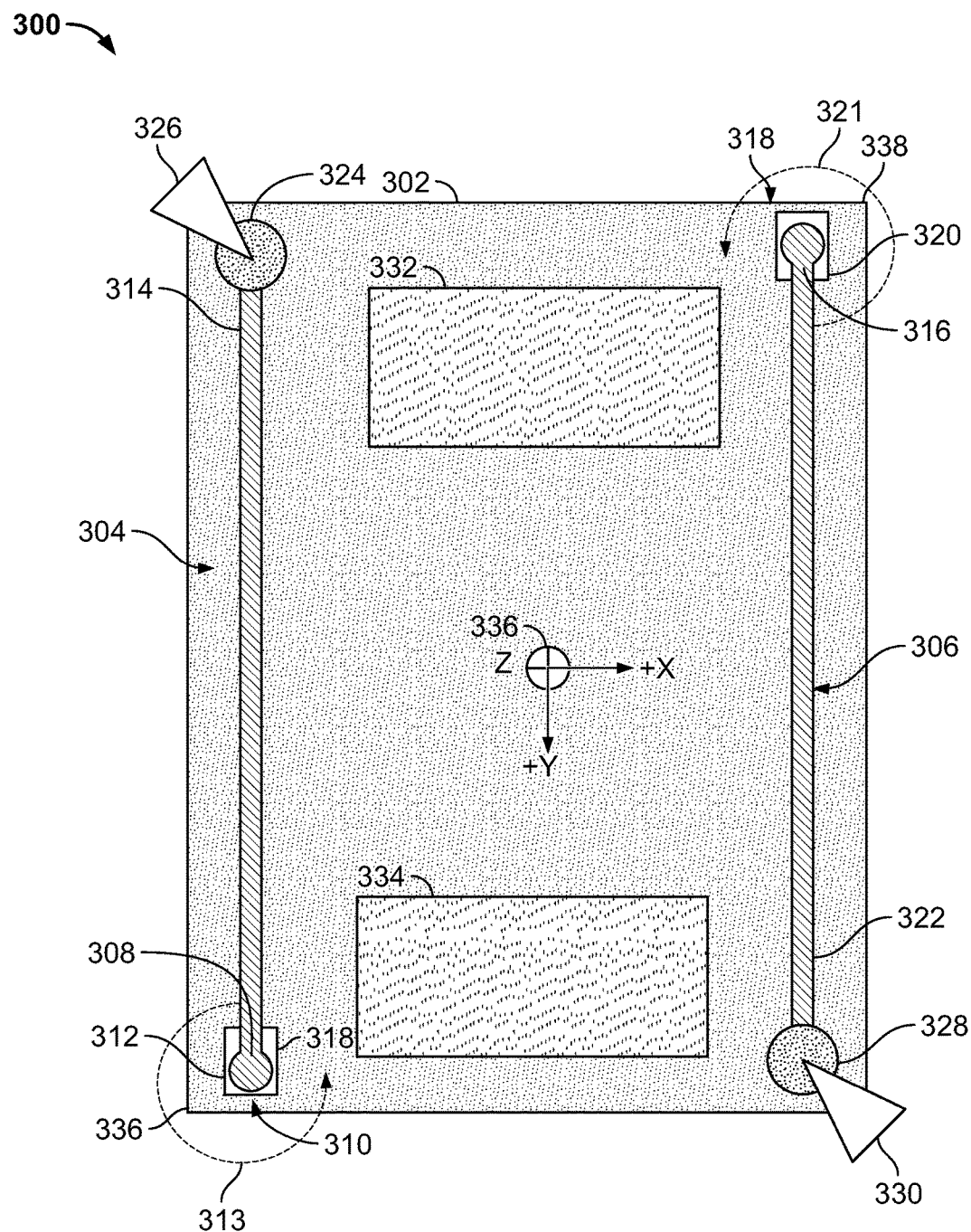
FIG. 3 is a schematic illustration of an example apparatus for orbit control and momentum control of a spacecraft in accordance with the teachings disclosed herein.

FIG. 3 is a schematic illustration of a satellite bus 300 of a satellite (e.g., the satellite 100 of FIG. 1) and in particular, illustrates an anti-nadir face 302 of the satellite bus 300 having a first extension arm 304 and a second extension arm 306 pivotably coupled to the satellite bus 300 in accordance with the examples disclosed herein. With respect to a reference coordinate system, in FIG. 3, the +X axis is pointing east, the +Y axis is point south, and the +Z axis is pointing toward Earth.

The first extension arm 304 has a first end 308 pivotably coupled to the anti-nadir face 302 of the satellite bus 300 at a first pivot point 310. In particular, the first end 308 of the first extension arm 304 is coupled to a first motor 312 at the first pivot 310. The first motor 312 drives the pivoting of the first end 308 of the first extension arm 304 about the first pivot point 310, as represented by the arrow 313. Thus, the first motor 312 causes the first extension arm 304 to rotate about the satellite at the first pivot point 310. The first extension arm 304 has a second end 314.

The second extension arm 306 has a first end 316 pivotably coupled to the anti-nadir face 302 of the satellite bus 300 at a second pivot point 318. The first end 316 of the second extension arm 306 is coupled to a second motor 320 at the second pivot point 318. The second motor 320 drives the pivoting of the first end 316 of the second extension arm 306 about the second pivot point 318, as represented by the arrow 321. Thus, the second motor 320 causes the second extension arm 306 to rotate about the satellite at the second pivot point 318. The second extension arm 306 has a second end 322.

Example materials of the first and second extension arms 304, 306 include aluminum, polycarbonate, titanium, and/or other materials capable of withstanding conditions in space. In some examples, each of the first and second extension arms 304, 306 has a length substantially equal to a length of the anti-nadir face 302 of the satellite bus 300. In other examples, the first and second extension arms 304, 306 are telescoping arms such that the length of each of the first and second extension arms 304, 306 can be selectively adjusted.

The length of the first and second extension arms 304, 306 provides increased leverage for moving the first and second thrusters away from the center of gravity of the satellite, as will be disclosed below.

A first gimbaled platform 324 is coupled to the second end 314 of the first extension arm 304. A first thruster 326 is coupled to the first gimbaled platform 324. A second gimbaled platform 328 is coupled to the second end 322 of the second extension arm 306. A second thruster 330 is coupled to the second gimbaled platform 328. Thus, the each of the first and second thrusters 326, 330 can be gimbaled to point toward or away from a center of gravity of the spacecraft during firing of the first and second thrusters 326, 330. Put another way, the gimbaled platforms 324, 328 rotate the respective first and second thrusters 326, 330 relative to the center of gravity of the spacecraft.

The example satellite bus 300 also includes system hardware 332, 334 coupled to the anti-nadir face 302. The system hardware 332, 334 includes, for example, batteries, processors, etc. for operation of subsystems such as those related to satellite power and navigation.

In the example satellite bus 300 of FIG. 3, the first pivot point 310 is disposed proximate to a first corner 336 of the satellite bus 300 and the second pivot point 318 is disposed proximate to a second corner 338 of the satellite bus 300, where the second corner 338 is diagonal to the first corner 336. When the first and second extension arms 304, 306 pivot about the respective first and second pivot points 310, 318, the first and second extension arms 304, 306 rotate outward relative to the satellite bus 300. Thus, interference between the system hardware 332, 334 and the first and second extension arms 304, 306, the first and second gimbaled platforms 324, 328, and the first and second thrusters 326, 330 is minimized as a result of positioning of the first and second pivot points 310, 318 relative to the system hardware 332, 334. Also, although in FIG. 3, the first and second pivot points 310, 318 are disposed proximate to the respective first and second corners 334, 338 of the satellite bus 300, in some examples the first and second extension arms 304, 306 are coupled to the satellite bus 300 at locations on the satellite bus 300 other than the first and second corners 334, 338. For example, the first and/or second pivot points 310, 318 can be positioned along a length of the satellite bus 300 or relative to longitudinal or lateral axes passing through the satellite bus 300 to couple the first and second extension arms 304, 306 to the satellite bus 300 at locations other than the first and second corners 334, 338. Also, although the satellite bus 300 of FIG. 3 is shown as including two extension arms 304, 306, in some examples, the satellite bus 300 includes more than two extension arms. The additional extension arm(s) can be coupled to the satellite bus 300 at, for example, the corners of the satellite bus 300 (e.g., the corners other than the first and second corners 334, 338) or along a length of the satellite bus 300 (e.g., proximate to the center of gravity 336). Thus, the satellite bus 300 can include additional extension arms and/or extension arms coupled to the satellite bus 300 at positions other than shown in FIG. 3.

In FIG. 3, the first and second extension arms 304, 306 and, thus, the first and second thrusters 326, 330 are in a stowed or stored position relative to a center of gravity 336 of the spacecraft. When the spacecraft having the satellite bus 300 is deployed in an orbit, forces such as gravitational forces and solar radiation pressure act on the spacecraft. To counteract the forces acting the spacecraft and maintain the position of the spacecraft in its predetermined orbit station, the orientation of the first and second thrusters 326, 330 is adjusted relative to the stowed position.

Figure 4:
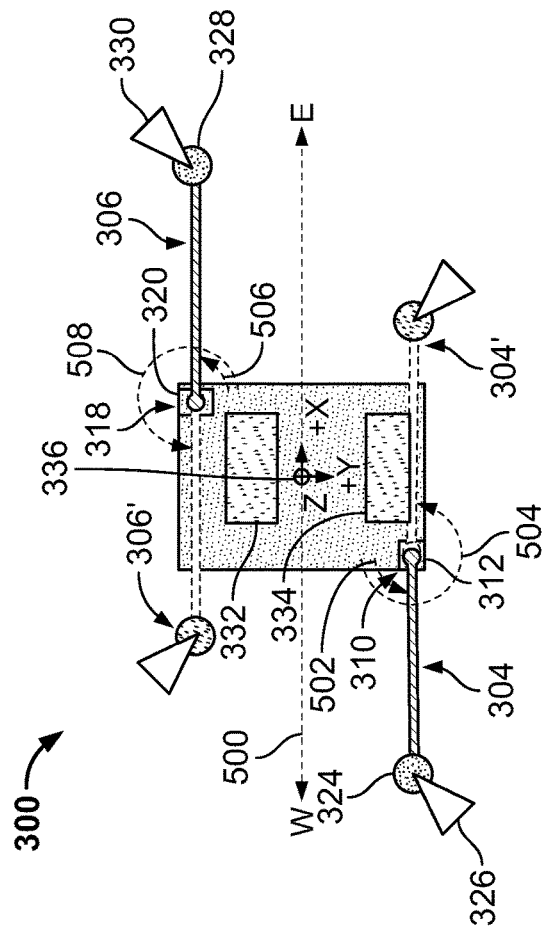
FIG. 4 is a schematic illustration of the example apparatus of FIG. 3 in a first example configuration for orbit control of the spacecraft in accordance with the teachings disclosed herein.

FIG. 4 is a schematic illustration of the satellite bus 300 of FIG. 3 with the extension arms 304, 306 pivoted about the first and second pivot points 310, 318 to provide inclination control, or stationkeeping of the spacecraft in the north/south directions, as represented by the north/south axis line 400 in FIG. 4. In the example of FIG. 4, the first and second thrusters 326, 330 are substantially aligned with north/south axis line 400 via the pivoting of the respective first and second extension arms 304, 306. Also, the first and second thrusters 326, 330 are gimbaled toward (e.g., rotated relative to) the center of gravity 336 along the north/south axis 400 via the respective first and second gimbaled platforms 324, 328 (e.g., the first and second thrusters 326, 330 point toward relative to the vicinity of the center of gravity 336). When one of the first or second thrusters 326, 330 fires along the north/south sides of the satellite bus 300, the thruster 326, 330 that fired produces a change in velocity ΔV in the normal and nadir (e.g., radial) directions to provide for inclination control of the satellite. In some examples, both of the first and second thrusters 326, 330 fire to provide eccentricity control.

As shown in FIG. 4, when the first and second extension arms 304, 306 are deployed, the first and second extension arms 304, 306 pivot outward relative to the satellite bus 300 about the respective first and second pivot points 310, 318, as represented by the arrows 402, 404 in FIG. 4. Thus, the first and second extension arms 304, 306 do not interfere with the system hardware 332, 334 when the respective first and second motors 312, 320 cause the first thruster 326 and/or the second thruster 330 to pivot about the respective first and second pivot points 310, 318.

Figure 5:
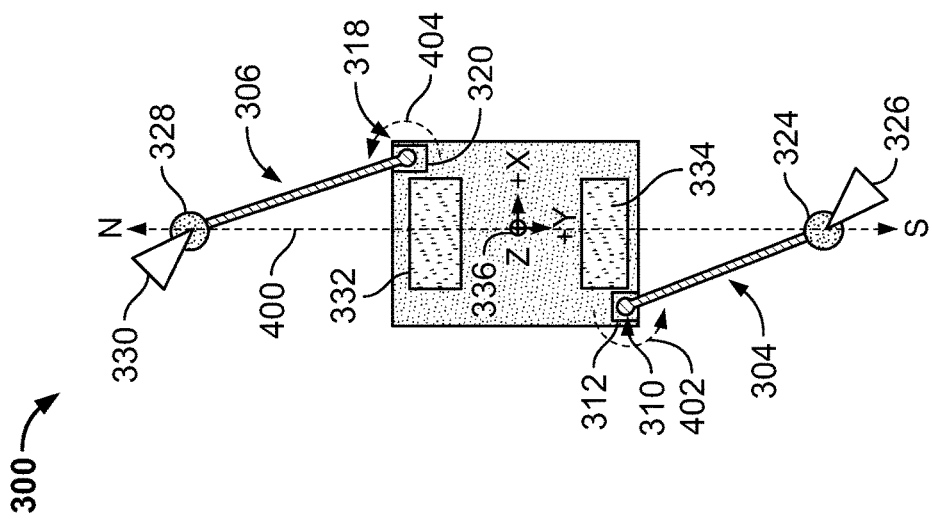
FIG. 5 is a schematic illustration of the example apparatus of FIG. 3 in a second example configuration for orbit control of the spacecraft in accordance with the teaching disclosed herein.

FIG. 5 is a schematic illustration of the satellite bus 300 of FIG. 3 with the extension arms 304, 306 pivoted about the first and second pivot points 310, 318 to provide inclination control, or stationkeeping of the spacecraft in the east/west directions, as represented by the east/west axis line 500 representative of east and west directions in FIG. 5. In the example of FIG. 5, the first and second thrusters 326, 330 are substantially aligned with east/west axis line 500 via the pivoting of the respective first and second extension arms 304, 306. Further, the first and second thrusters 326, 330 are gimbaled toward (e.g., rotated relative to) the center of gravity 336 along the east/west axis 500 via the respective first and second gimbaled platforms 324, 328 (e.g., the first and second thrusters 326, 330 point toward the vicinity of the center of gravity 336). When the first or second thruster 326, 330 fires along the east/west sides of the satellite bus 300, the thruster(s) 326, 330 produce a change in velocity ΔV in the tangential and nadir directions to provide for drift and eccentricity control of the satellite. In some examples, both of the first and second thrusters 326, 330 fire to provide drift and eccentricity control.

When the first and second extension arms 304, 306 are deployed, the first and second extension arms 304, 306 pivot outward relative to the satellite bus 300 about the respective first and second pivot points 310, 318. As shown in FIG. 5, the first extension arm 304 can pivot a first amount or degree about the first pivot point 310 via the first motor 312 to position the first thruster 326 on the west side of the satellite bus 300, as represented by the first arrow 502. The first extension arm 304 can pivot a second amount or degree about the first pivot point 310 via the first motor 312 to position the first thruster 326 on the east side of the satellite bus 300, as represented by the second arrow 504 and the phantom first extension arm 304'. Similarly, the second extension arm 306 can pivot a first amount or degree about the second pivot point 318 to position the second thruster 330 on the east side of the satellite bus 300, as represented by the third arrow 506. The second extension arm 306 can pivot a second amount or degree about the second pivot point 318 to position the second thruster 330 on the west side of the satellite bus 300, as represented by the fourth arrow 508 and the phantom second extension arm 306'. Thus, the first and second extension arms 304, 306 provide for flexible positioning of the first and second thrusters 326, 330 relative to the east and west sides of the satellite bus 300 and thereby eliminate the need for thrusters that only move in the east or west directions. Further, as disclosed above with respect to FIG. 4, the first and second extension arms 304, 306 do not interfere with the system hardware 332, 334 when the respective first and second motors 312, 320 cause the first thruster 326 and/or the second thruster 330 to pivot about the respective first and second pivot points 310, 318. In some examples, the first and second extension arms 304, 306 pivot between a range of 0°-270° about the respective first and second pivot points 310, 318.

FIGS. 4 and 5 illustrate orbital control of a spacecraft with respect to north/south stationkeeping and east/west stationkeeping, respectively. As illustrated in FIGS. 4 and 5, the example extension arms 304, 306 provide for inclination, drift, and eccentricity control via the selective firing of the first thruster 326 and/or the second thruster 328. The first and second extension arms 304, 306 are levers that selectively pivot to position the first and second thrusters 326, 330 in the north, south, east, and west directions, thereby increasing flexibility with respect to positioning the first and second thrusters 326, 330 relative to the center of gravity 336. For example, as shown with respect to FIG. 5, an amount that the first extension arm 304 pivots about the first pivot point 310 can be adjusted to position the first thruster 326 on the west or east sides of the satellite bus 304.

As disclosed above with respect to FIGS. 4 and 5, in some examples the first and second thrusters 326, 330 are selectively positioned relative to the north/south and east/west axes 400, 500 via the respective first and second extension arms 304, 306 and the first and second thrusters 326, 330 fire when the first and second extension arms 304, 306 are in the extended positions. In other examples, the first and/or second thrusters 326, 330 fire when the first and/or second extension arms 304, 306 are in the stowed or stored positions as illustrated in FIG. 3. For example, when the first and second extension arms 304, 306 are in the stowed positions, the first and second thrusters 326, 330 are rotated via the respective first and second gimbaled platforms 324, 328 such that the first and second thrusters 326, 330 point in the z-axis direction relative to the satellite 300. Firing of the first and/or second thrusters 326, 330 from these thruster positions produces thrust (e.g., thrust vector(s)) parallel to the z-axis. The thrust generated by the first and/or second thrusters 326, 330 when the first and/or second thrusters 326, 330 are pointed in the z-axis direction can be used to control satellite orientation and/or momentum dumping during transfer orbit operations (e.g., operations occurring from separation of the satellite 300 from a launch vehicle to positioning of the satellite 300 in predetermined orbital station). During transfer orbit operations, the angle in which the first thruster 326 and/or the second thruster 330 is directed relative to the satellite 300 can be adjusted via the respective first and second gimbaled platforms 324, 328 to produce torques that change the orientation of the satellite 300 or dump momentum. In some such examples, the first and/or second extension arms 304. 306 move (e.g., pivot) from the stowed positions to extended positions to further position the first and/or second thrusters 326, 330 to achieve satellite orientation and/or momentum control during transfer orbit operations. Thus, the first and second thrusters 326, 330 can fire when the first and second extension arms 304, 306 are in the stowed positions of FIG. 3 or the example deployed positions of FIGS. 4 and 5 based on different satellite operations.

Further, in the event the first extension arm 304 and/or the second extension arm 306 fails to deploy (e.g., pivot about the respective first and second pivot points 310, 312) due to, for example, mechanical failure with respect to one or more of the first extension arm 304, the first motor 312, the second extension arm 306, and/or the second motor 318, the first and second thrusters 326, 330 are still able to provide for stationkeeping. The locations of the example first and second thrusters 326, 330 in the stowed positions as shown in FIG. 3 allow the first and second thrusters 326, 330 to fire to maintain the orbit of the spacecraft from the stowed positions (e.g., as if the first and second thrusters were coupled to the satellite bus 300 without the respective first and second extension arms 304, 306). In such instances, the first and second thrusters 326, 330 can be gimbaled about the first and second gimbaled platforms 324, 328 with respect to the center of gravity 336 to provide orbital maneuvers that maintain the orbit of the spacecraft.

As disclosed above with respect to FIG. 4, when the first thruster 326 and/or the second thruster 328 are aligned with the north/south axis 400, the firing of the first thruster 326 and/or the second thruster 328 produces a change in velocity $\Delta V$ in the normal and nadir (e.g., radial) directions to provide inclination control. As disclosed above with respect to FIG. 5, when the first thruster 326 and/or the second thruster 328 are aligned with the east/west axis 500, the firing of the first thruster 326 and/or the second thruster 328 produces a change in velocity $\Delta V$ in the tangential and nadir (e.g., radial) directions to provide drift and eccentricity control. In known examples, the orbital maneuvers to control inclination are performed separately from the maneuvers to control drift and eccentricity. Such known examples require firing of three thrusters. For example, to maintain a spacecraft's orbit, a magnitude $\Delta V$ and a location $\lambda$ of a maneuver that can correct the orbit can be found. Equations for inclination ($K_2$, $H_2$) control provided by $\Delta V$ normal components $n_3$ are:

$$\Delta V_3 n_3 \cos \lambda_3 = \Delta V_{K_2} \quad \text{(Eq. 1); and}$$

$$\Delta V_3 n_3 \sin \lambda_3 = V_{H_2} \quad \text{(Eq. 2),}$$ where $\Delta Vi$ is a magnitude of the $\Delta V$ for an $i^{th}$ maneuver; $n_i$ is a direction cosine of $\Delta V_i$ along an orbital normal direction; $\lambda i$ is an applied $\Delta V$ for ascension; $\Delta V_{K_2}$ is a minimum $\Delta V$ required to control mean $K_2$; and $\Delta V_{H_2}$ is a minimum $\Delta V$ required to control mean $H_2$.

Equations for eccentricity ($K_1$, $H_1$) control provided by $\Delta V$ radial and tangential components $r_i$ and $t_i$ and drift control provided by $\Delta V$ tangential components $t_i$ are:

$$\sum_{i=1,2} \Delta V_i t_i = \Delta V_{drift}; \quad \text{(Eq. 3)}$$

$$\sum_{i=1,2} \Delta V_i (2 t_i \cos \lambda_i + r_i \sin \lambda_i) = \Delta V_{K_1}; \text{ and} \quad \text{(Eq. 4)}$$

$$\sum_{i=1,2} \Delta V_i (2 t_i \sin \lambda_i - r_i \cos \lambda_i) = \Delta V_{H_1}, \quad \text{(Eq. 5)}$$

where ΔVi is a magnitude of the ΔV for an $i^{th}$ maneuver; $t_i$ is a direction cosine $\Delta V_i$ along an orbital tangential direction; $\Delta V_{drift}$ is a minimum ΔV required to control longitudinal drift for a geosynchronous orbit along a semi-major axis; $r_i$ is a direction cosine of $\Delta V_i$ along an orbital radial direction; $\Delta V_{K_1}$ is a minimum ΔV required to control mean $K_i$; and $\Delta V_{H_1}$ is a minimum ΔV required to control mean $H_1$.

Figure 6:
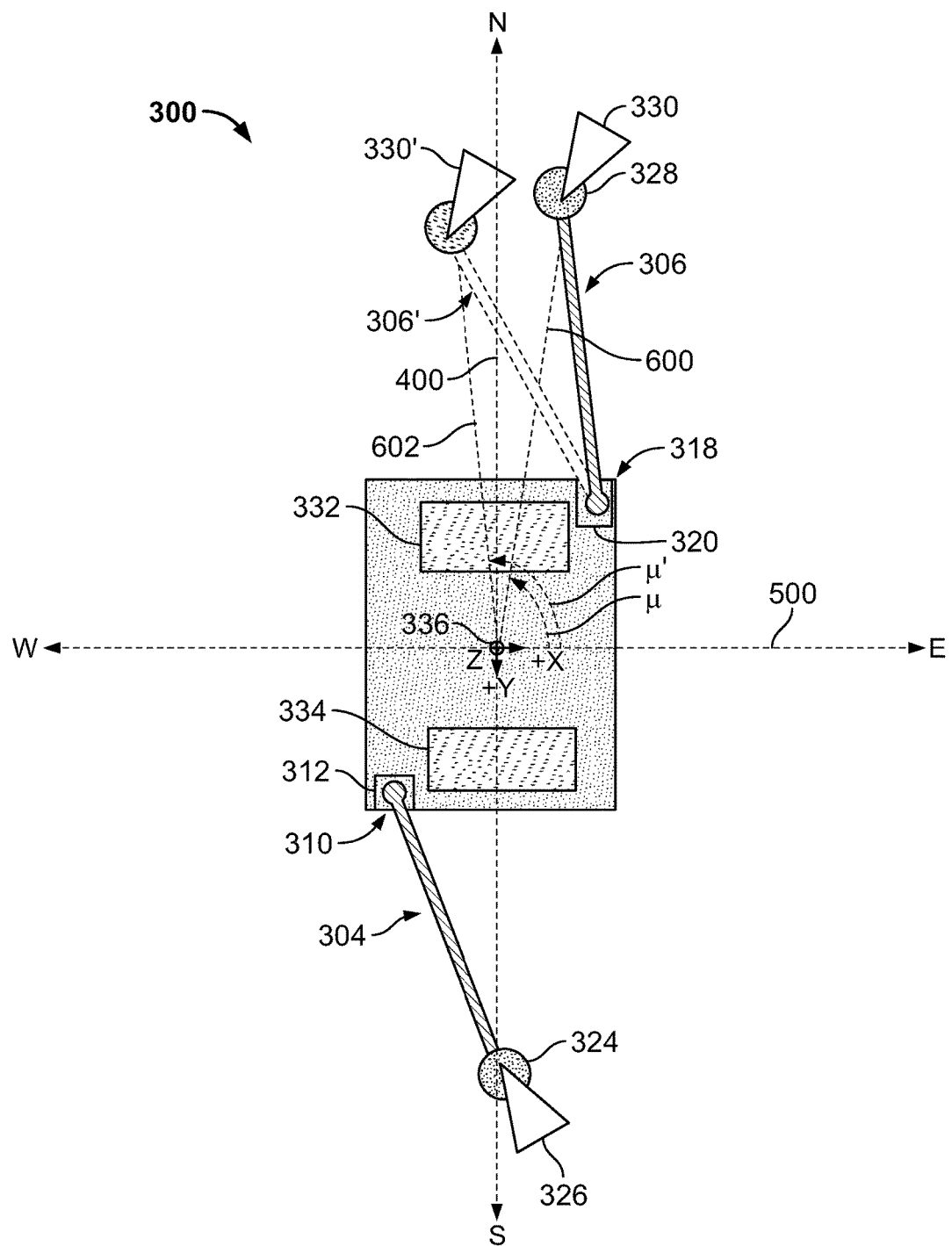
FIG. 6 is a schematic illustration of the example apparatus of FIG. 3 in third example configuration for orbit control of the spacecraft in accordance with the teachings disclosed herein.

To efficiently control the north/south and the east/west motion of the satellite associated with the satellite bus 300, the first thruster 326 and/or the second thruster 328 can be positioned off of (e.g., not aligned with) the north/south axis 400 of FIG. 4 to produce ΔV in the normal, nadir, and tangential directions. FIG. 6 is a schematic illustration of the satellite bus 300 of FIG. 3 with the extension arms 304, 306 pivoted about the first and second pivot points 310, 318 to provide substantially simultaneous inclination, drift, and eccentricity control, or substantially simultaneous station-keeping of the spacecraft with respect the north/south axis and the east/west axis.

As illustrated in FIG. 6, the second extension arm 306 can be pivoted about the second pivot point 318 via the second motor 320 such that the second extension arm 306 and, thus, the second thruster 330, are positioned between the north/south axis 400 and the east/west axis 500. As compared to example of FIG. 4, where the second thruster 330 is substantially aligned with the north/south axis 400, in the example of FIG. 6, the second thruster 330 is not aligned the north/south axis 400. The positioning of the second thruster 330 between the north/south axis 400 and the east/west axis 500 allows the second thruster 330 to produce ΔV in the tangential direction as well as the normal and radial directions to control inclination, drift, and eccentricity.

The angle of the second thruster 330 about the center of gravity 336 relative to the north/south axis 400 and the east/west axis 500 is represented by the value μ in FIG. 6. For example, when the second extension arm 306 pivots a first amount about the second pivot point 318, an angle having a value of μ is formed relative to the east/west axis 500, as represented by the arrow 600 in FIG. 6. The second extension arm 306 can pivot a second amount about the second pivot point 318, as represented by the extension arm 306' and the second thruster 330' in FIG. 6. In such examples, an angle having a value of μ' is formed relative to the east/west axis 500 as represented by the arrow 602.

To find the value of μ for positioning, for example, the second thruster 330 relative to the north/south axis 400 and the east/west axis 500, the equations for inclination control (e.g., Equations 1 and 2 above) and the equations for drift and eccentricity control (e.g., Equations 3-5 above) are combined. The value μ is computed from the tangential and normal components of the ΔV, in addition to the magnitude ΔV and the location λ of the maneuver that corrects the orbit. In this example, the orbital maneuvers to correct the orbit can be achieved using the first and second thrusters 326, 330. The value μ can be found using the following equations:

$$\sum_{i=1,2} \Delta V_i t_i = \Delta V_{drift}; \quad \text{(Eq. 3)}$$

$$\sum_{i=1,2} \Delta V_i (2 t_i \cos\lambda_i + r_i \sin\lambda_i) = \Delta V_{K_1}; \quad \text{(Eq. 4)}$$

$$\sum_{i=1,2} \Delta V_i (2 t_i \sin\lambda_i - r_i \cos\lambda_i) = \Delta V_{H_1}; \quad \text{(Eq. 5)}$$

-continued $$\sum_{i=1,2} \Delta V_i n_i \cos\lambda_i = \Delta V_{K_2}; \quad \text{(Eq. 6)}$$

$$\sum_{i=1,2} \Delta V_i n_i \sin\lambda_i = \Delta V_{H_2}; \text{ and} \quad \text{(Eq. 7)}$$

$$\mu_i = \tan^{-1}\left(\frac{n_i}{t_i}\right). \quad \text{(Eq. 8)}$$

Based on the above equations, the value μ for positioning the first thruster 326 and/or the second thruster 330 relative to the north/south axis and the east/west axis via the pivoting of the first and/or second extension arms 304, 306 can be determined. The value μ can be determined to achieve substantially simultaneous control of the inclination, drift, and eccentricity motion of the spacecraft. As a result of the positioning of the first and/or second thruster 326, 330 at the μ value, an amount of ΔV having normal, radial, and tangential components is produced to efficiently control the north/south and the east/west motion of the spacecraft.

Figure 7:
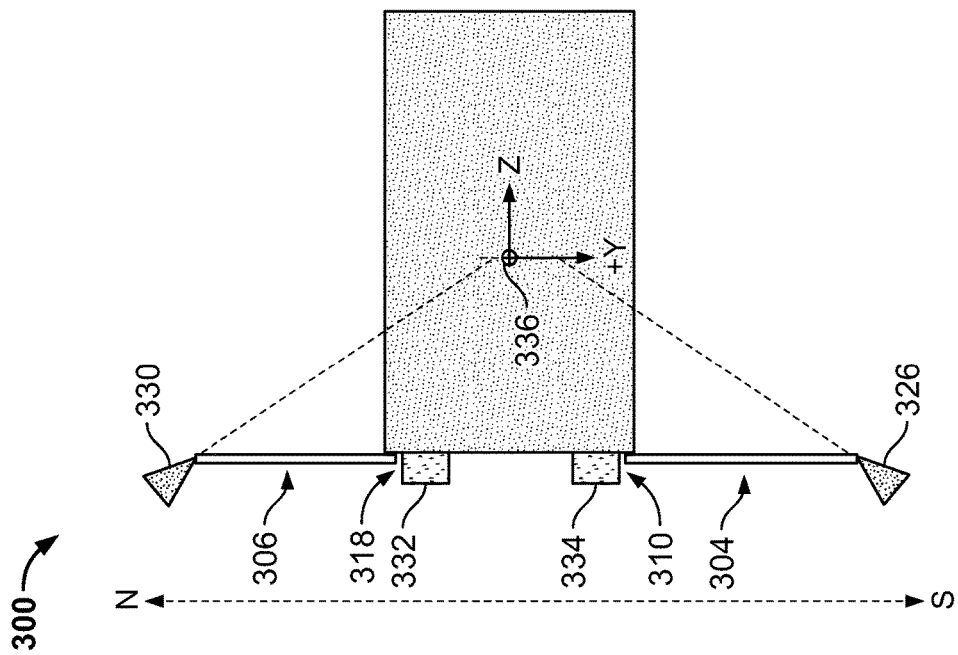
FIG. 7 is a schematic illustration of the example apparatus of FIG. 3 in a first example configuration for momentum control of the spacecraft in accordance with the teaching disclosed herein.

The example first and second thrusters 326, 330 coupled to the respective first and second extension arms 304, 306 can also be manipulated to control momentum of the spacecraft. To control the momentum of the spacecraft, the thrusters can be pointed away from the center of gravity to generate torque during orbital maneuvers. FIG. 7 is a schematic illustration of the satellite bus 300 along the y-axis and the z-axis. As shown in FIG. 7, the first thruster 326 is pointed south of the center of gravity 336 along the +y-axis by pivoting the first extension arm 304 about the first pivot point 310 and gimbaling the first thruster 330 about the first gimbaled platform 324 of FIGS. 3-6. When the first thruster 326 is pointed south of the center of gravity 336 during firing, the first thruster 326 generates positive roll torque (about the +x-axis). As also shown in FIG. 7, the second thruster 330 is pointed north of the center of gravity 336 along the −y-axis by pivoting the second extension arm 306 about the second pivot point 318 and gimbaling the first thruster 330 about the first gimbaled platform 328 of FIGS. 3-6. When the second thruster 330 is pointed north of the center of gravity 336 during firing, the second thruster 330 generates a negative roll torque. In such a manner, roll torque about the x-axis can be generated as part of controlling the spacecraft's momentum.

Figure 8:
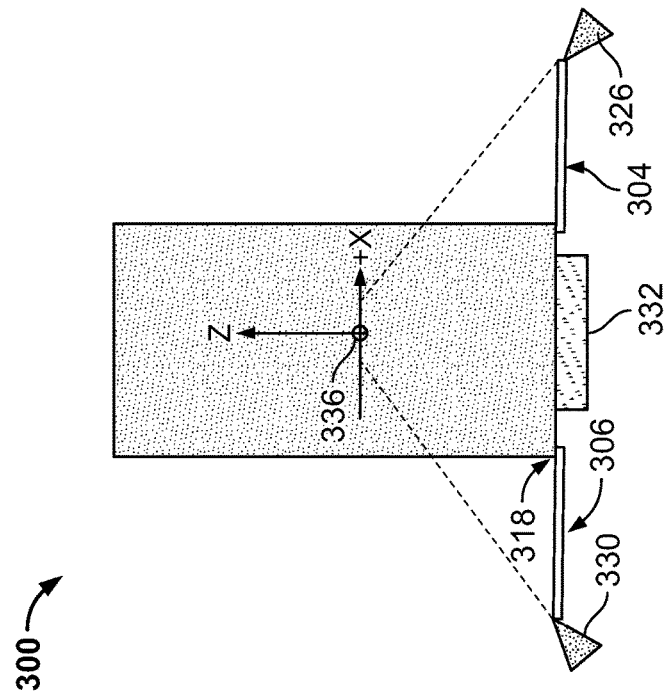
FIG. 8 is a schematic illustration of the example apparatus of FIG. 3 in a second example configuration for momentum control of the spacecraft in accordance with the teaching disclosed herein.

FIG. 8 is a schematic illustration of the satellite bus 300 along the x-axis and the z-axis. As shown in FIG. 8, the first thruster 326 is pointed west of the center of gravity 336 along the −x-axis by pivoting the first extension arm 304 about the first pivot point 310 and gimbaling the first thruster 330 about the first gimbaled platform 324 of FIGS. 3-6. When the first thruster 326 is pointed east of the center of gravity 336 during firing, the first thruster 326 generates negative pitch torque (about the −x-axis). As also shown in FIG. 8, the second thruster 330 is pointed east of the center of gravity 336 along the +x-axis by pivoting the second extension arm 306 about the second pivot point 318 and gimbaling the first thruster 330 about the first gimbaled platform 328 of FIGS. 3-6. When the second thruster 330 is pointed east of the center of gravity 336 during firing, the second thruster 330 generates a positive pitch torque.

Further, positive and negative yaw torque about the +z-axis can be generated by pointing the first and second thrusters 326, 330 north and south of the center of gravity 336 during firing. Thus, momentum control of the satellite can be achieved via generation of torque in the directions of the x-axis (roll), y-axis (pitch), and z-axis (yaw). By moving the first and second thrusters 326, 330 away from the center of gravity 336 via the pivoting of the first and second extensions arms 304, 306 and the rotation of the gimbaled platforms 324, 328 of FIGS. 3-6, torque can be generated to provide momentum control in addition to orbit control.

Figure 9:
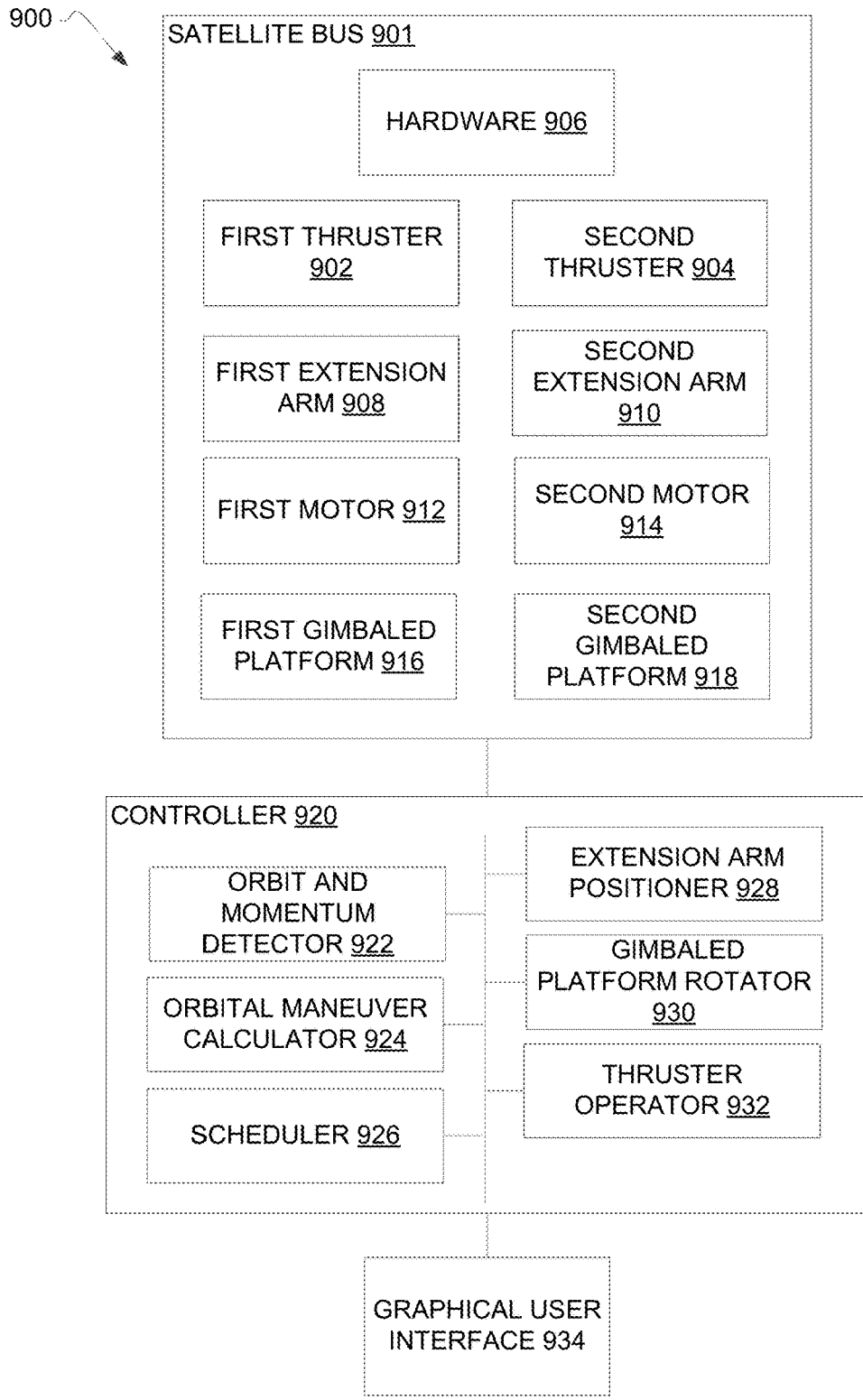
FIG. 9 is a block diagram of an example control system for orbit control and momentum control using the example apparatus of FIGS. 3-8.

FIG. 9 is a block diagram of an example control system 900 for controlling a spacecraft's orbit and momentum via thrusters coupled to pivotable extension arms. In the example system 900 of FIG. 9, a satellite bus 901 (e.g., the satellite bus 300 of FIGS. 3-8) of a spacecraft includes a first thruster 902 (e.g., the first thruster 326 of FIGS. 3-8), a second thruster 904 (e.g., the second thruster 330 of FIGS. 3-8), and hardware 906 such as a batteries (e.g., the hardware 332, 334 of FIGS. 3-8).

The satellite bus 901 of the example control system 900 of FIG. 9 includes a first extension arm 908 (e.g., the first extension arm 304 of FIGS. 3-8) and a second extension arm 910 (e.g., the second extension arm 306 of FIGS. 3-8). A first end of the first extension arm 908 is coupled to the satellite bus 901 via a first motor 912, which causes the first extension arm 908 to pivot about a first pivot point on the satellite bus 901 (e.g., the first pivot point 310 of FIGS. 3-8). A first end of the second extension arm 910 is coupled to the satellite bus 901 via a second motor 914, which causes the second extension arm 910 to pivot about a second pivot point on the satellite bus 901 (e.g., the second pivot point 318 of FIGS. 3-8).

The first thruster 902 is coupled to a second end of the first extension arm 908 and the second thruster 904 is coupled to a second end of the second extension arm 910. In the example satellite bus 901 of FIG. 9, the first thruster 902 is disposed on a first gimbaled platform 916 (e.g., the first gimbaled platform 324 of FIGS. 3-6). The first gimbaled platform 916 is coupled to the second end of the first extension arm 908. Also, the second thruster 904 is disposed on a second gimbaled platform 918 (e.g., the first gimbaled platform 328 of FIGS. 3-6). The second gimbaled platform 918 is coupled to the second end of the second extension arm 910. The first and second gimbaled platforms 916, 918 selectively rotate the respective first and second thrusters 902, 904 to point the first and second thrusters 902, 904 in a predetermined direction relative to, for example, a center of gravity of the spacecraft. In the example control system 900 of FIG. 9, the degree to which the first and second extension arms 908, 910 pivot and the direction in which the first and second gimbaled platforms 916, 918 rotate to position the respective first and second thrusters 902, 904 is determined by a controller 920.

The controller 920 includes an orbit and momentum detector 922. The orbit and momentum detector 922 determines a current orbit or orbit station in which the spacecraft is located. The orbit and momentum detector 922 also stores data about an orbit station in which the spacecraft is intended to be located during deployment of the spacecraft. The orbit and momentum detector 922 determines whether the current orbit is the orbit in which the spacecraft is to be located. The orbit and momentum detector 922 also determines the current momentum state of the spacecraft. The orbit and momentum detector 922 stores data about predetermined and/or threshold momentum states of the spacecraft. The orbit and momentum detector 922 also determines the current position of the first and second thrusters 902, 904 based on the current disposition of the respective first and second extension arms 908, 910 and/or the rotation of the respective first and second gimbaled platforms 916, 918.

If the orbit and momentum detector 922 determines that the current orbit is not the intended orbit and/or the current momentum state does not correspond to a predetermined momentum state for the spacecraft, the orbit and momentum detector 922 transmits data about the orbit and/or momentum disturbances or perturbations to an orbital maneuver calculator 924. In some examples, the orbital maneuver calculator 924 predicts and/or estimates the orbit perturbations and torques disturbances over a predetermined time period, or control cycle, for stationkeeping of the spacecraft.

The orbital maneuver calculator 924 solves one or more of the equations for inclination, drift, and/or eccentricity (e.g., Equations 1-8) to determine the magnitude of the velocity change $\Delta V$ and the location $\lambda$ of the maneuver by the first thruster 902 and/or the second thruster 904 that corrects the orbit as well as the normal, radial, and/or tangential components of the $\Delta V$ produced by the first and/or second thrusters 902, 904 to correct the orbit of the spacecraft. In some examples, the orbital maneuver calculator 924 calculates a value $\mu$ for positioning the first thruster 902 and/or the second thruster 904 relative to the north/south axis and the east/west axis such that the first thruster 902 and/or the second thruster 904 substantially simultaneously control the inclination, drift, and eccentricity of the spacecraft as disclosed above with respect to Equations 3-8. The orbital maneuver calculator 924 also determines a position of the first and/or second thrusters 902, 904 with respect to the center of gravity of the spacecraft to produce torque to control the momentum of the spacecraft as disclosed above with respect to FIGS. 7 and 8.

The example controller 920 includes a scheduler 926. When the orbital maneuver calculator 924 determines the positioning of the first and/or second thrusters for stationkeeping of the satellite, the scheduler 926 determines a time at which the first and/or second thrusters 902, 904 are to fire to control the orbit and/or momentum of the satellite. The scheduler 926 also determines whether one or both of the first or second thrusters 902, 904 are to fire and if both thrusters 902, 904 are to fire, a sequence in which the first and second thrusters 902, 904 are to fire to achieve inclination, drift, and/or eccentricity control as determined by the orbital maneuver calculator 924.

The example controller 920 includes an extension arm positioner 928. The extension arm positioner 928 provides instructions to the first motor 912 to cause the first extension arm 908 to pivot to an amount or degree determined by the orbital maneuver calculator 924 to position the first thruster 902 for orbital control. For example, the extension arm positioner 928 can instruct the first motor 912 to cause the first extension arm 908 to pivot such that the first thruster 902 is positioned at the value $\mu$ relative to the north/side and east/west axes as determined by the orbital maneuver calculator 924 to produce a change in velocity $\Delta V$ in the normal, nadir (e.g., radial), and tangential directions. The extension arm positioner 928 also provides instructions to the second motor 914 to cause the second extension arm 910 to pivot to a degree determined by the orbital maneuver calculator 924 to position the second thruster 904 for orbital control.

The example controller 920 includes a gimbaled platform rotator 930. The gimbaled platform rotator 930 controls the rotation of the first gimbaled platform 916 to position the first thruster 902 in a direction relative to the center of gravity of the spacecraft to produce a torque determined by the orbital maneuver calculator 924 to control the momentum of spacecraft. For example, the gimbaled platform rotator 930 can instruct the first gimbaled platform 916 to rotate such that the first thruster 902 points north of the center of gravity to produce a negative roll torque or west of the center of gravity to produce a negative pitch torque during firing of the first thruster 902 as disclosed above in connection with FIGS. 7 and 8. The gimbaled arm rotator 930 also controls the rotation of the second gimbaled platform 918 to position the second thruster 904 in a direction relative to the center of gravity of the spacecraft to produce a torque determined by the orbital maneuver calculator 924.

The example controller 920 also includes a thruster operator 932. The thruster operator 932 controls the firing of the first thruster 902 and the second thruster 904 based on the times determined by the scheduler 926 in accordance with the magnitude of the ΔV and the positioning of the thrusters 902, 904 for orbital and momentum control determined by the orbit maneuver calculator 924.

A graphical user interface (GUI) 934 displays, for example, the current orbit and momentum state detected by the orbit and momentum detector 922 to an operator. The GUI 934 can also display other data such as the results of the calculations performed by the orbital maneuver calculator 924 to achieve stationkeeping of the spacecraft and the timing of the firing of the first and second thrusters 902, 904 scheduled by the scheduler 926. The GUI 934 can display values such as the value μ indicative of the positioning of the thrusters 902, 904 and an amount of propellant used and/or remaining. The operator can also use the GUI 934 for troubleshooting purposes.

While an example manner of implementing the example system 900 is illustrated in FIG. 9, one or more of the elements, processes and/or devices illustrated in FIG. 9 may be combined, divided, re-arranged, omitted, eliminated and/or implemented in any other way. Further, the example satellite bus 901, the example first thruster 902, the example second thruster 904, the example hardware 906, the example first extension arm 908, the example second extension arm 910, the example first motor 912, the example second motor 914, the example first gimbaled platform 916, the example second gimbaled platform 918, the example controller 920, the example orbit and momentum detector 922, the example orbital maneuver calculator 924, the example scheduler 926, the example extension arm positioner 928, the gimbaled platform rotator 930, the example thruster operator 932, the example graphical user interface 934, and/or, more generally, the example system 900 of FIG. 9 may be implemented by hardware, software, firmware and/or any combination of hardware, software and/or firmware. Thus, for example, any of the example satellite bus 901, the example first thruster 902, the example second thruster 904, the example hardware 906, the example first extension arm 908, the example second extension arm 910, the example first motor 912, the example second motor 914, the example first gimbaled platform 916, the example second gimbaled platform 918, the example controller 920, the example orbit and momentum detector 922, the example orbital maneuver calculator 924, the example scheduler 926, the example extension arm positioner 928, the gimbaled platform rotator 930, the example thruster operator 932, the example graphical user interface 934, and/or, more generally, the example system 900 of FIG. 9 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example satellite bus 901, the example first thruster 902, the example second thruster 904, the example hardware 906, the example first extension arm 908, the example second extension arm 910, the example first motor 912, the example second motor 914, the example first gimbaled platform 916, the example second gimbaled platform 918, the example controller 920, the example orbit and momentum detector 922, the example orbital maneuver calculator 924, the example scheduler 926, the example extension arm positioner 928, the gimbaled platform rotator 930, the example thruster operator 932, the example graphical user interface 934, and/or, more generally, the example system 900 of FIG. 9 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 900 of FIG. 9 may include one or more elements, processes and/or devices in addition to, or instead of, those illustrated in FIG. 9, and/or may include more than one of any or all of the illustrated elements, processes and devices.

Figure 10:
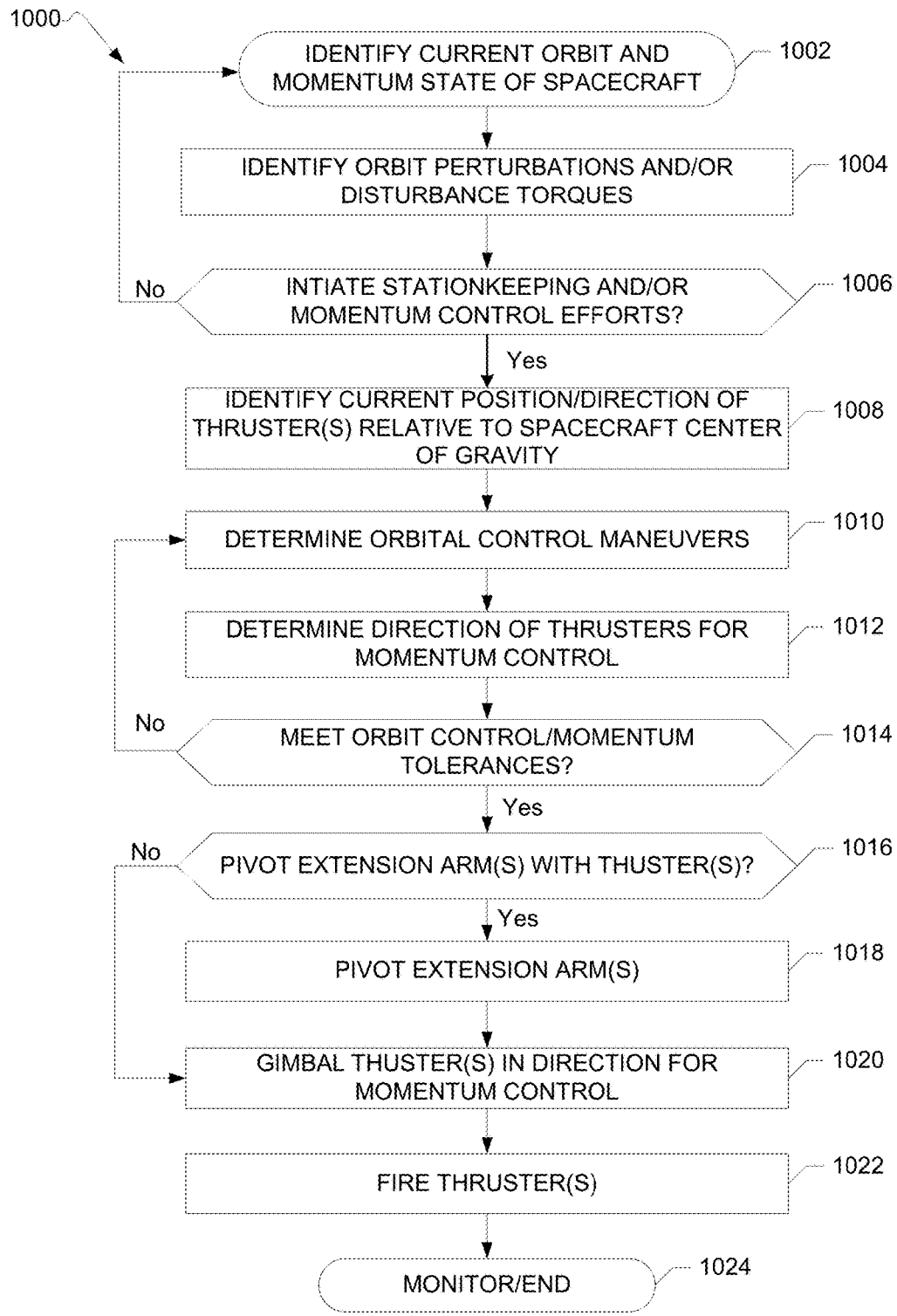
FIG. 10 is a flow diagram of an example method that may be executed to implement the example control system of FIG. 9.

FIG. 10 illustrates a flowchart representative of an example method 1000 that can be implemented to provide orbit control and momentum control of a spacecraft via thrusters coupled to pivotable extension arms. In particular, the example method 1000 can be implemented using two thrusters (e.g., the first and second thrusters 326, 330, 902, 904 of FIGS. 3-9) respectively coupled to pivotable extension arms (e.g., the first and second extension arms 304, 306, 908, 910 of FIGS. 3-9). The example method 1000 begins with identifying a current orbit in which the spacecraft is located and a current momentum state of the spacecraft (block 1002). The current orbit and the current momentum state can be detected by the orbit and momentum detector 922 of the controller 920 of FIG. 9.

The example method 1000 includes identifying orbital perturbations or changes and/or disturbance torques to the spacecraft caused by, for example, gravitational forces acting upon the spacecraft (block 1004). The orbit perturbations and/or disturbance torques can be detected by the example orbit and momentum detector 922. In some examples, the orbit perturbations and/or disturbance torques are determined relative to threshold and/or predetermined orbit stations and/or momentum states for the spacecraft. In some examples, the orbit perturbations and/or disturbance torques are determined over a predetermined time period, or control cycle, for stationkeeping such that expected orbit perturbations and/or disturbance torques are computed by, for example, the orbital maneuver calculator 924 of FIG. 9.

Based on the identification of the current orbit and momentum state of the spacecraft and orbit perturbations and/or disturbance torques (or expected orbit perturbations and/or expected disturbance torques), the example method 1000 includes a decision whether to initiate orbital stationkeeping and/or momentum control efforts (block 1006). The decision whether to initiate orbital stationkeeping and/or momentum control efforts can be made by the controller 920 of FIG. 9 including, for example, the orbit and momentum detector 922. In some examples, although gravitational forces are acting on the spacecraft, the orbit of the spacecraft has not been affected beyond a threshold that requires the thrusters to fire to maintain the orbit station of the spacecraft. In such examples, the example method 1000 returns to identifying the current orbit and momentum state of the spacecraft as part of monitoring the spacecraft's orbital location.

If, based on the identification of the current orbit and momentum state of the spacecraft and orbit perturbations and/or disturbance torques, a decision is made to initiate stationkeeping and/or momentum control efforts to maintain the spacecraft's orbital station, the example method 1000 continues with identifying a current position and direction of the thrusters (e.g., the first and second thrusters 326, 330, 902, 904 of FIGS. 3-9) relative to a center of gravity of the spacecraft (block 1008). For example, the thrusters can be coupled to respective extension arms (e.g., the first and second extension arms 304, 306, 908, 910 of FIGS. 3-9). The position of the thrusters relative to the center of gravity as a result of the extension arms being in a stowed or stored position (e.g., as shown in FIG. 3) or an extended position (e.g., as shown in FIGS. 4-9) can be identified. In some examples, the orbit and momentum detector 922 identifies the current position of the thrusters. The thrusters can be disposed on gimbaled platforms (e.g., the first and second gimbaled platforms 324, 328, 916, 918 of FIGS. 4-6, 9) that gimbal or rotate to point the thrusters toward or away from the center of gravity of the spacecraft. The example method 1000 includes identifying the direction in which the thrusters point relative to the center of gravity as a result of the rotation of the thrusters via the gimbaled platforms during, for example, earlier stationkeeping efforts.

As part of the stationkeeping efforts, the example method 1000 includes determining orbital control maneuvers to be performed by the thrusters (block 1010). The determination of the orbital control maneuvers, including, for example, the positioning of the thrusters, can be determined by the orbital maneuver calculator 924 of FIG. 9. For example the orbital control maneuver calculator 924 can use one or more of Equations 3-8 to determine a value $\mu$ for positioning one or more of the thrusters relative to a north/south axis and an east/west axis via the pivoting of the respective extension arms to which the thrusters are coupled. In the example method 1000, the orbital control maneuver calculator 924 determines the value $\mu$ to achieve substantially simultaneous control of the inclination, drift, and eccentricity motion of the spacecraft via generation of a change in velocity $\Delta V$ having normal, nadir, and tangential components.

The example method 1000 also includes determining a direction for pointing the one or more thrusters for momentum control of the spacecraft (block 1012). For example, the orbital maneuver calculator 924 determines whether the one or more thrusters should point north or south of the center of gravity to produce negative/positive roll torque about the x-axis or west or east of the center of gravity to produce negative/positive pitch torque about the y-axis.

The example method 1000 includes a determination of whether the orbital control maneuvers and/or the generation of torque determined at blocks 1010 and 1012 will meet orbit control and momentum tolerances for the spacecraft (block 1014). For example, if the orbital control maneuvers and/or the direction for pointing the one or more thrusters determined at blocks 1010 and 1012 do not maintain the spacecraft within a predetermined orbit station, then the example method 1000 returns to determining orbital control maneuvers and/or direction for pointing the one or more thrusters. Thus, in the example method 1000, rather than determining an exact solution to the orbit control and momentum equations (e.g., Equations 1-8), solutions are determined that satisfy threshold constraints for maintaining the orbit and/or momentum state of the spacecraft. This approach provides for flexibility in positioning the thrusters to meet the predetermined orbit and/or momentum states within a threshold range and increases efficiency the orbit and moment control as compared to determining an exact solution to the orbit control and momentum equations, which requires four thrusters.

If the orbital control maneuvers and thruster direction determined at blocks 1010 and 1012 meet the orbit control and momentum tolerances, the example method 1000 proceeds with positioning the one or more thrusters in accordance with the maneuvers and direction determined at blocks 1010 and 1012. In some examples, the orbital control maneuvers and thruster direction are provided to a scheduler (e.g., the scheduler 926 of FIG. 9) for execution at a later time.

To achieve orbital control, the example method 1000 includes a decision whether to pivot one or more of the extension arms about a pivot point (e.g., the first and second pivot points 310, 318 of FIGS. 3-8) to position the thrusters relative to the north/south and the east/west axes (block 1016). The decision whether to pivot the one or more of the extension arms can be based on, for example, the operations to be performed by the spacecraft. For example, during transfer orbit operations, or operations occurring from separation of the spacecraft from a launch vehicle to positioning of the spacecraft in predetermined orbital station, a decision may be made to fire the thrusters while the extension arms are in stowed positions (e.g., as shown in FIG. 3). Thus, a decision is made not to pivot the extension arms. In other examples, a decision is made to pivot one or more of the extension arms during a transfer orbit operation (or any other operation during one or more stages of the spacecraft's mission) if needed to position one or more of the thrusters relative to a north/south and/or east/west axis to generate thrust or torque to change the spacecraft's orientation or dump momentum. In some examples, the decision whether to pivot the extension arms is based on the calculation of the value $\mu$ for the thruster position (e.g., at block 1010).

If a decision is made to pivot one or more of the extension arms, the example method continues with pivoting the one or more extension arms (block 1018). The pivoting of the extension arm(s) can be driven by a motor associated with each extension arm (e.g., the first and second motors 912, 914). In some examples, the extension arm positioner 928 of FIG. 9 instructs the motor(s) to drive the pivoting of the extension arm(s) to the position determined by the orbital maneuver calculator 924 based on, for example, the calculation of the value $\mu$ for the thruster position.

If a decision is made not to pivot the extension arms or if the arms have been pivoted, the example method 1000 includes gimbaling the one or more thrusters to point in the direction determined to produce the appropriate torque relative to the center of gravity of the spacecraft during firing (block 1024). The thrusters can be rotated via the gimbaled platform to which the respective thrusters are coupled. The gimbaling of the platforms to point the thrusters in direction determined by the orbital maneuver calculator 924 can be controlled by the example gimbaled platform rotator 930 of FIG. 9 based on, for example, the type of torque to be generated (e.g., roll, pitch, yaw).

When the one or more thrusters are positioned with respect to the north/south and east/west axes for generating a change in velocity $\Delta V$ and are pointing in the direction to generate the computed torque, the example method 1000 includes firing the one or more thrusters (block 1022). The firing of the thrusters can be controlled by the example thruster operator 932 of FIG. 9. The example method 1000 continues to monitor the orbital and momentum states of the spacecraft after firing of the thrusters (block 1024).

Thus, the example method 1000 provides for efficient determination of the positioning of one or more thrusters to provide orbit and momentum control for a spacecraft. The example method 1000 provides for flexibility in positioning the thrusters via the pivoting of the extension arms to achieve orbit control in the normal, nadir, and tangential directions and gimbaling of the gimbaled platforms to produce torque for momentum control that fall within threshold ranges for stationkeeping. Further, the orbit and momentum control can be achieved by selectively positioning and firing two thrusters, which decreases fuel consumption, weight of the spacecraft, and costs as compared to spacecrafts including four thrusters.

The flowchart of FIG. 10 is representative of example methods that may be used to implement the example system 900 of FIG. 9. In this example, the method may be implemented using machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example system 900 may alternatively be used. For example, the order of execution of the blocks may be changed, and/or some of the blocks described may be changed, eliminated, or combined.

As mentioned above, the example method of FIG. 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 11:
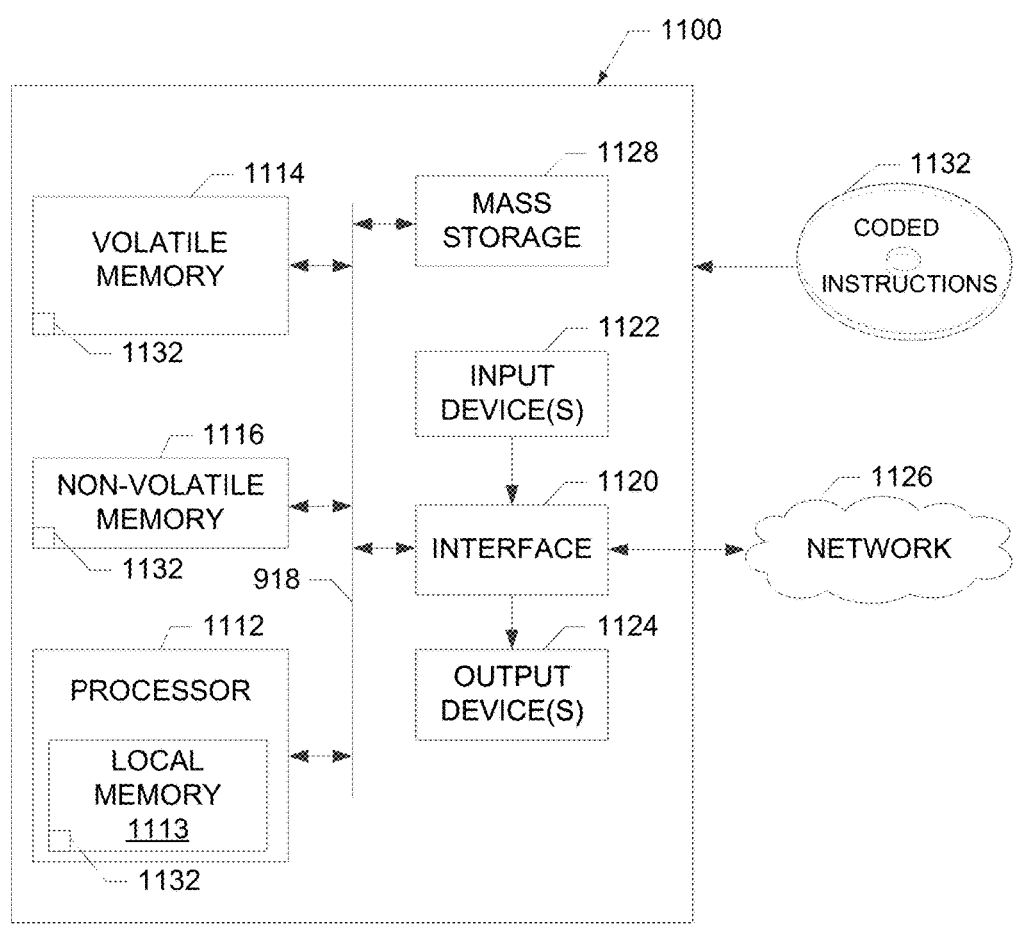
FIG. 11 is a diagram of an example processor platform that may be used to carry out the example method of FIG. 10 and/or, more generally, to implement the example control system of FIG. 9.

FIG. 11 is a block diagram of an example processor platform 1100 capable of executing instructions to implement the method of FIG. 10 and the example system 900 of FIG. 9. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 of FIG. 11 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed systems, methods, and apparatus provide for efficient orbit and momentum control of a spacecraft via thrusters rotatably coupled to extension arms that are pivotable relative to the spacecraft. The extension arms of the disclosed examples are levers that selectively pivot to position the thrusters relative to the north/south axis and the east/west axis to maintain the spacecraft in a predetermined orbit station. The extension arms provide increased flexibility with respect to positioning the thrusters relative to the center of gravity of the spacecraft. The flexibility in positioning the thrusters along the north, south, east, and west sides of the spacecraft allows orbit control to be achieved using two thrusters, thereby substantially reducing the weight of the spacecraft, fuel usage, and operational costs. Furthermore, the extension arms position the thrusters such that the change in velocity produced by the firing of one or more of the thrusters has components in the normal, nadir (e.g., radial), and tangential components. Thus, the disclosed examples provide for substantially simultaneous inclination, drift, and eccentricity control of the spacecraft. Also, in the disclosed examples, the thrusters are rotated via gimbaled platforms coupled to the extension arms to generate torques that control the momentum of the spacecraft. As such, the disclosed examples provide for efficient orbital stationkeeping and momentum control of a spacecraft while minimizing interference with other operational components of the spacecraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A spacecraft comprising:
a first arm having a first end pivotably coupled to a first pivot point of the spacecraft and a second end;
a first thruster rotatably coupled to the second end of the first arm;
a second arm having a first end pivotably coupled to a second pivot point of the spacecraft and a second end; and
a second thruster coupled to the second end of the second arm,
the first arm extending from the first pivot point along a first edge of an anti-nadir face of the spacecraft when the first arm is in a stowed position and the second arm extending from the second pivot point along a second edge of the anti-nadir face opposite the first edge when the second arm is in a stowed position, the first thruster and the second thruster disposed at the anti-nadir face of the spacecraft when the first arm is in the stowed position and the second arm is in the stowed position,
the first arm configured to pivot between (a) the stowed position of the first arm, (b) a first extended position of the first arm in which the first arm extends outward from the spacecraft relative to the first edge, and (c) a second extended position of the first arm in which the first arm extends along a third edge of the anti-nadir face and the first thruster is disposed outward of the second edge, and
the second arm configured to pivot between (a) the stowed position of the second arm, (b) a first extended position of the second arm in which the second arm extends outward from the spacecraft relative to the second edge, and (c) a second extended position of the second arm in which the second arm extends along a fourth edge of the anti-nadir face and the second thruster is disposed outward of the first edge, wherein the third edge is opposite the fourth edge.

2. The spacecraft of claim 1, wherein the first thruster is rotatably coupled to the second end of the first arm via a gimbaled platform.

3. The spacecraft of claim 2, wherein the gimbaled platform is configured to rotate the first thruster relative to a center of gravity of the spacecraft.

4. The spacecraft of claim 1, further including a motor, the first end of the first arm coupled to the motor.

5. The spacecraft of claim 1, wherein the first arm has a length substantially equal to a length of the anti-nadir face of the spacecraft.

6. The spacecraft of claim 1, wherein the first arm comprises aluminum.

7. The spacecraft of claim 1, wherein the first arm is configured to (1) selectively pivot about the first pivot to position the first thruster in the first extended position of the first arm to generate the change in velocity in a tangential direction and a radial direction during firing and (2) selectively pivot about the first pivot point to position the first thruster in the second extended position of the first arm to generate the change in velocity in a normal direction and a radial direction during firing.

8. The spacecraft of claim 1, wherein the first pivot point is disposed proximate to a first corner formed by the first edge and the third edge of the anti-nadir face of the spacecraft and the second pivot point is disposed proximate to a second corner formed by the second edge and the fourth edge of the anti-nadir face of the spacecraft.

9. The spacecraft of claim 1, wherein each of the first arm and the second arm is configured to pivot between a range of 0° and 270° about the respective first pivot point and the second pivot point.

10. The spacecraft of claim 1, wherein when the first arm is in the first extended position of the first arm, the first thruster is disposed a first distance from the first edge and when the first arm is in the second extended position of the first arm, the first thruster is disposed a second distance from the second edge, the first distance greater than the second distance.

11. The spacecraft of claim 1, wherein the first arm is a non-articulated arm.

12. The spacecraft of claim 1, wherein the first edge has a first length and the third edge has a third length less than the first length.

13. The spacecraft of claim 1, wherein the first arm is to rotate outward relative to the anti-nadir face of the spacecraft to pivot between the first extended position of the first arm and the second extended position of the first arm.

14. A method comprising:
determining, by executing an instruction with a processor, a position of a first thruster of a satellite relative to the satellite to correct an orbit of the satellite, the first thruster rotatably coupled to a first arm at a first pivot point, the first arm coupled to the satellite, the first arm configured to pivot between (a) a stowed position in which the first arm extends from the first pivot point along a first edge of a face of the satellite, (b) a first extended position in which the first arm extends outward relative to the first edge of the face of the satellite, and (c) a second extended position in which the first arm extends along a second edge of the face of the satellite and the first thruster is disposed outward of a third edge of the face of the satellite, wherein the first edge is opposite the third edge;

determining, by executing an instruction with the processor, whether the first arm is to be in one of the stowed position, the first extended position, or the second extended position during firing of the first thruster based on the determination of the position of the first thruster to correct the orbit;

if the one of the stowed position, the first extended position, or the second extended position differs from a current position of the first arm, moving the first arm to the determined one of the stowed position, the first extended position, or the second extended position; and firing the first thruster to correct the orbit of the satellite with the first arm in the one of the stowed position, the first extended position, or the second extended position.

15. The method of claim 14, further comprising:

determining a second position of the first thruster relative to a center of gravity of the satellite to control a momentum of the satellite; and rotating the first thruster relative to the center of gravity of the satellite based on the second position.

16. The method of claim 15, wherein the rotating comprises pointing the first thruster away from the center of gravity to cause the thruster to produce one or more of roll torque, pitch torque, or yaw torque upon firing of the first thruster.

17. The method of claim 14, further comprising:

determining a second position of a second thruster relative to the satellite to correct the orbit of the satellite;

pivoting a second arm coupled to the satellite about the satellite to move the second thruster to the second position, the second thruster coupled to the second arm; and determining a time for at least one of the first thruster or the second thruster to fire.

18. The method of claim 14, further including determining if the position corrects the orbit of the satellite within a predetermined threshold relative to an intended orbit for the satellite.

19. The method of claim 14, wherein when the first arm is in the first extended position of the first arm, an end of the first arm to which the first thruster is coupled is disposed a first distance relative to the first edge of the face of the satellite and when the first arm is in the second extended position of the first arm, the end of the first arm is disposed a second distance relative to the first edge, the second distance greater than the first distance.

20. An apparatus comprising:

a first arm pivotably coupled to a spacecraft;

a first thruster rotatably coupled to the first arm at a pivot point, wherein the first arm is configured to rotate between (a) a stowed position in which the first arm extends from the first pivot point along a first edge of a face of the spacecraft, (b) a first extended position in which the first arm extends outward from the spacecraft relative to the first edge of the face of the spacecraft, and (c) a second extended position in which the first arm extends along a second edge of the face of the spacecraft and the first thruster is disposed outward of a third edge of the face of the spacecraft, wherein the first edge is opposite the third edge; and a controller including a processor, the controller configured to:

determine an amount to pivot the first arm about the spacecraft to position the first thruster to generate a change in velocity of the spacecraft to maintain the spacecraft within an orbit station; and based on the determination one of maintain the first arm in the stowed position, rotate the first arm to the first extended position relative to the spacecraft, or rotate the first arm to the second extended position relative to the spacecraft, the first thruster configured to generate the change in the velocity when the first arm is in the stowed position, in the first extended position, or in the second extended position.

21. The apparatus of claim 20, further including a motor operatively coupled to the first thruster.

22. The apparatus of claim 20, further including a second arm pivotably coupled to the spacecraft and a second thruster coupled to the second arm, the controller further configured to:

determine an amount to pivot the second arm about the spacecraft to position the second thruster; and schedule one or more of the first thruster or the second thruster to fire at a predetermined time to generate the change in velocity of the spacecraft to maintain the spacecraft within the orbit station.

23. The apparatus of claim 20, further comprising a gimbaled platform, the first thruster coupled to the first arm via the gimbaled platform, and the controller further configured to determine an amount to rotate the gimbaled platform to point the first thruster relative to a center of gravity of the spacecraft to generate a torque during firing of the first thruster.

24. The spacecraft of claim 20, wherein the controller is further configured to determine an amount to pivot the first arm to perform a transfer orbit operation and to cause the first arm to pivot to the determine amount of pivot.

* * * * *

UNITED STATES PATENT AND TRADEMARK OFFICE
CERTIFICATE OF CORRECTION

PATENT NO. : 10,569,909 B2
APPLICATION NO. : 15/085081
DATED : February 25, 2020
INVENTOR(S) : Yiu-Hung Monte Ho Page 1 of 1

It is certified that error appears in the above-identified patent and that said Letters Patent is hereby corrected as shown below:

In the Claims

Column 22, Line 20:
After "determination" insert -- , --.

Signed and Sealed this
Twenty-ninth Day of September, 2020

Andrei Iancu
*Director of the United States Patent and Trademark Office*